(12) United States Patent
Gaudreau, Jr.

(10) Patent No.: US 8,764,108 B2
(45) Date of Patent: Jul. 1, 2014

(54) ADJUSTABLE HEADREST FOR JUVENILE VEHICLE SEAT

(75) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 218 days.

(21) Appl. No.: 13/427,739

(22) Filed: Mar. 22, 2012

(65) Prior Publication Data

US 2012/0242127 A1    Sep. 27, 2012

Related U.S. Application Data

(60) Provisional application No. 61/466,365, filed on Mar. 22, 2011.

(51) Int. Cl.
*B60N 2/28* (2006.01)

(52) U.S. Cl.
USPC .................. 297/250.1; 297/410; 297/484

(58) Field of Classification Search
CPC ........... A47D 15/00; A47D 1/00; B60N 2/26; B60N 2/286; B60N 2/2812; B60N 2/2884; B60N 2/2851; B60N 2002/2818
USPC ............... 297/250.1, 216.11, 467, 484, 410
See application file for complete search history.

(56) References Cited

U.S. PATENT DOCUMENTS

| | | |
|---|---|---|
| 3,992,056 A | 11/1976 | Koziatek et al. |
| 4,033,622 A | 7/1977 | Boudreau |
| 4,183,580 A | 1/1980 | Johansson |
| 4,613,188 A | 9/1986 | Tsuge et al. |
| 4,632,456 A | 12/1986 | Kassai |
| 5,082,325 A | 1/1992 | Sedlack |
| 5,366,271 A | 11/1994 | Johnston et al. |
| 5,468,046 A | 11/1995 | Weber et al. |
| 6,338,529 B1 | 1/2002 | David et al. |
| 6,398,302 B1 * | 6/2002 | Freedman et al. ......... 297/250.1 |
| 6,764,135 B2 | 7/2004 | Sasaki et al. |
| 6,808,232 B2 | 10/2004 | Takizawa |
| 6,817,673 B2 | 11/2004 | Walker et al. |
| 7,086,695 B2 * | 8/2006 | Hosoya .................... 297/256.16 |
| 7,246,854 B2 | 7/2007 | Dingman et al. |
| 7,344,192 B2 | 3/2008 | Kespohl |
| 7,380,878 B2 | 6/2008 | Clement et al. |
| 7,467,824 B2 | 12/2008 | Nakhla et al. |
| 7,472,952 B2 | 1/2009 | Nakhla et al. |
| 7,475,941 B2 | 1/2009 | Clement et al. |
| 2005/0110315 A1 | 5/2005 | Littlehorn et al. |
| 2006/0006712 A1 | 1/2006 | Clement et al. |
| 2009/0200842 A1 | 8/2009 | Goldberg et al. |
| 2009/0256404 A1 * | 10/2009 | Strong et al. ............. 297/216.11 |
| 2013/0033076 A1 * | 2/2013 | Campbell et al. ........ 297/216.11 |
| 2013/0161986 A1 * | 6/2013 | Kopp ......................... 297/250.1 |
| 2013/0320725 A1 * | 12/2013 | Conway ................... 297/256.11 |

* cited by examiner

Primary Examiner — Sarah B McPartlin
(74) Attorney, Agent, or Firm — Barnes & Thornburg LLP

(57) ABSTRACT

A child restraint includes a juvenile seat and a child-restraint harness coupled to the juvenile seat. The child restraint also includes a headrest mounted for up-and-down movement relative to a seat back included in the juvenile seat.

30 Claims, 10 Drawing Sheets

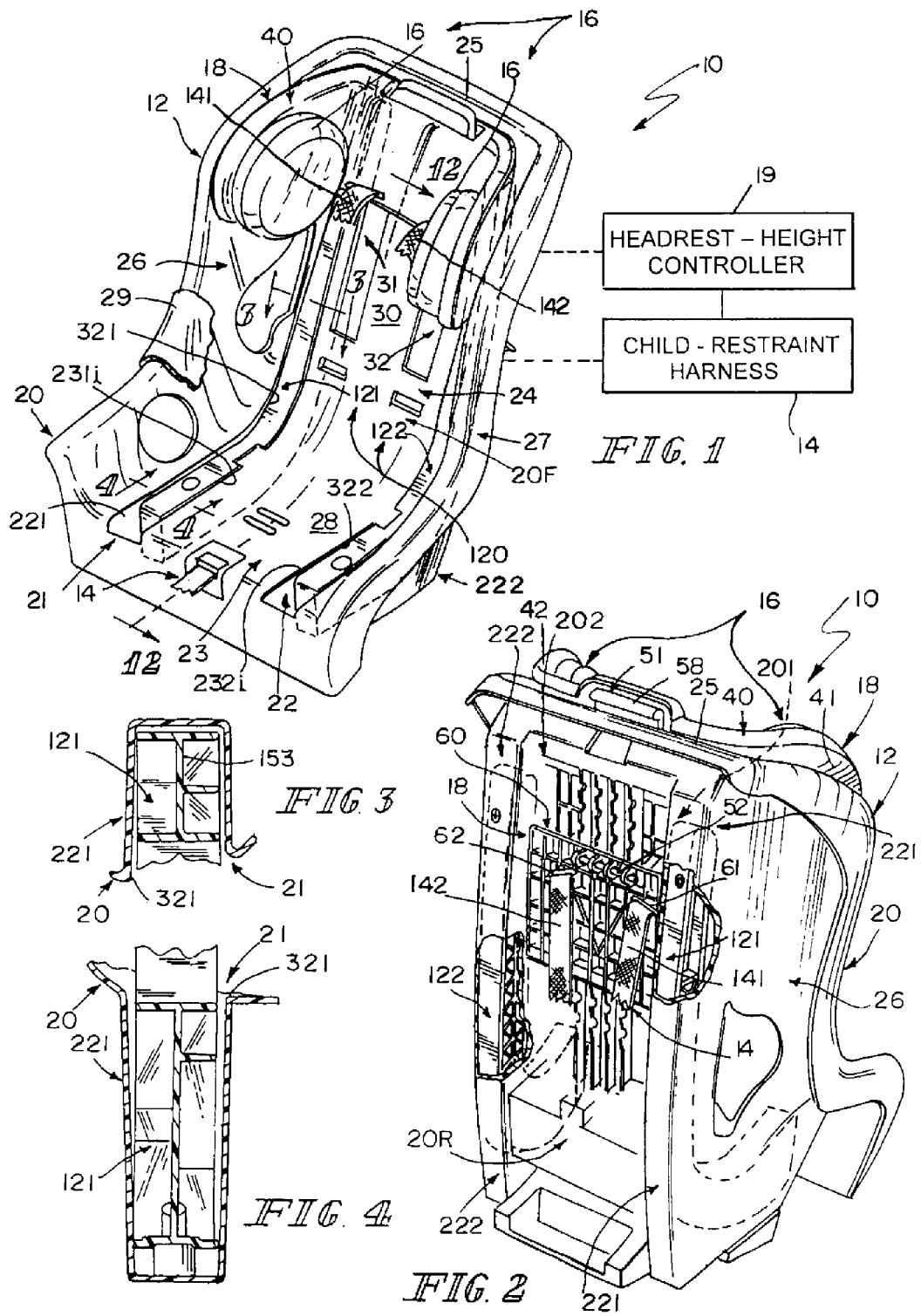

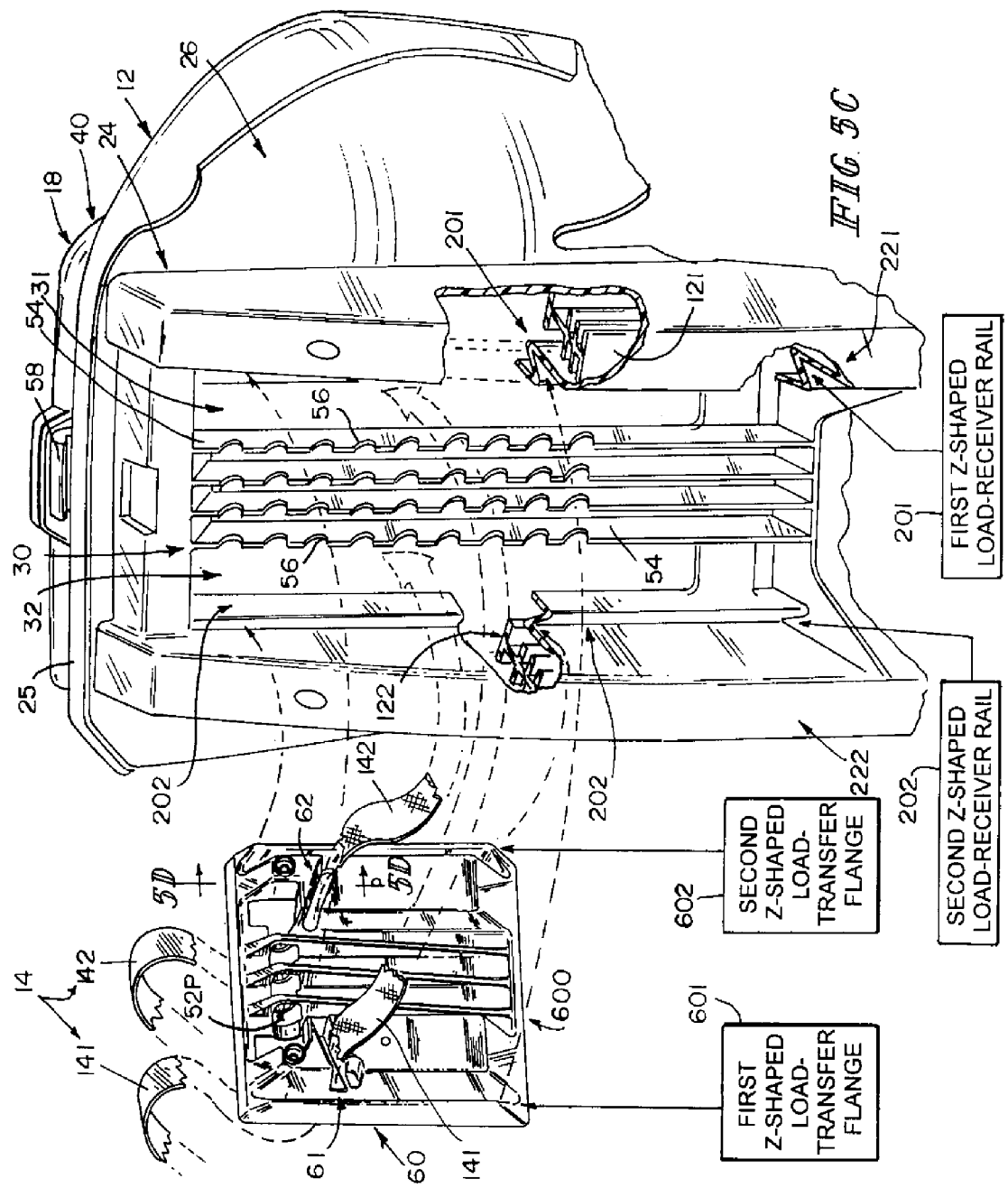

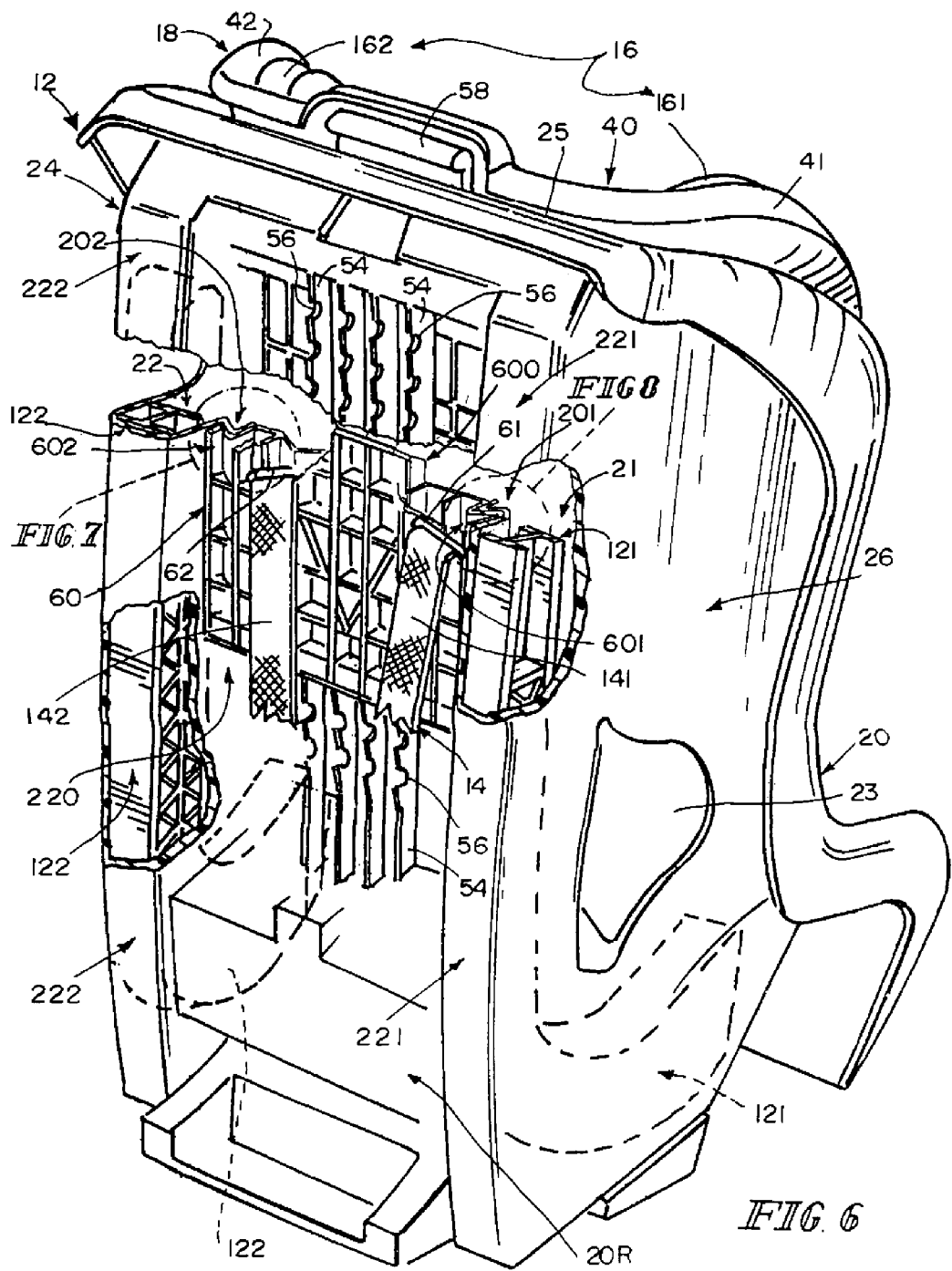

US 8,764,108 B2

ADJUSTABLE HEADREST FOR JUVENILE VEHICLE SEAT

PRIORITY CLAIM

This application claims priority under 35 U.S.C. §119(e) to U.S. Provisional Application Ser. No. 61/466,365, filed Mar. 22, 2011, which is expressly incorporated by reference herein.

BACKGROUND

The present disclosure relates to child restraints, and in particular, to juvenile seats for use on passenger seats in vehicles. More particularly, the present disclosure relates to rigidifying structures included in juvenile seats.

SUMMARY

According to the present disclosure, a child restraint includes a juvenile seat and a child-restraint harness coupled to the juvenile seat. The juvenile seat includes a seat bottom and a seat back extending upwardly from the seat bottom.

In illustrative embodiments, the child restraint further includes a headrest coupled to the child-restraint harness and mounted for up-and-down movement on the seat back. A first load-transfer flange included in the headrest is arranged to engage and slide on a companion first load-receiver rail included in the seat back during up-and-down movement of the headrest relative to the seat back. In illustrative embodiments, the headrest also includes a second load-transfer flange arranged to engage and slide on a companion second load-receiver rail included in the seat back.

The seat bottom and seat back cooperate to form a seat shell in an illustrative embodiment. The child restraint also includes a rigidifying system coupled to the seat shell in an illustrative embodiment.

A rigidifying system comprising first and second stiffener beams is included in the child restraint and coupled to the seat bottom and back to rigidify the seat shell. The first stiffener beam is arranged to extend along and lie near to the first load-receiver rail included in the seat back. The second stiffener beam is arranged to extend along and lie near to the second load-receiver rail included in the seat back.

In illustrative embodiments, loads applied to the headrest during exposure of a vehicle carrying the child restraint to an external impact are transferred to the rigidifying system that is coupled to the seat shell owing to mating engagement of the headrest and seat shell in accordance with the present disclosure. The headrest is configured to provide means for (1) engaging the child-restraint harness to receive a load applied to the child-restraint harness by a seated child seated and restrained on the seat bottom of the juvenile seat during movement of the seated child relative to the juvenile seat in response to a sudden stop of a moving vehicle carrying the juvenile seat and (2) transferring the load from the headrest to the rigidifying system coupled to the seat shell. In illustrative embodiments, that load is transferred via a first load-transfer path established by mating engagement of the first load-transfer flange included in the headrest and the companion first load-receiver rail included in the seat back and arranged to extend alongside the first stiffener beam and via a second load-transfer path established by mating engagement of the second load-transfer flange included in the headrest and the companion second load-receiver rail included in the seat back and arranged to extend alongside the second stiffener beam.

In illustrative embodiments, the headrest includes a head cradle located on a front side of the seat back above the seat bottom to receive the head of a child seated in the juvenile seat. The headrest also includes a slidable cradle retainer located on an opposite back side of the seat back and coupled to the head cradle to move therewith during up-and-down movement of the headrest on the seat back.

The slidable cradle retainer is formed to include the first and second load-transfer flanges and is coupled to the first and second shoulder belts. The slidable cradle retainer is configured to provide means for transferring loads (applied by the first and second shoulder belts to the slidable cradle retainer in response to movement of the seated child relative to the juvenile seat to tension the first and second shoulder belts during exposure of a vehicle carrying the juvenile seat to an external impact) to the first and second stiffener beams in the rigidifying system via two load-transfer paths established by mating engagement of the first and second load-transfer flanges on the slidable cradle retainer and the companion first and second load-receiver rails included in the seat back and arranged to extend along and lie near to the first and second stiffener beams. In illustrative embodiments, each of the load-transfer flanges and load-receiver rails has a Z-shaped cross-sectional shape.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint in accordance with the present disclosure for use on a passenger seat in a vehicle, with portions of a fabric covering broken away, showing a juvenile seat and a head cradle of an adjustable headrest included in the juvenile seat and mounted for up-and-down movement on the seat back;

FIG. 2 is a rear view of the child restraint of FIG. 1, with portions of a seat shell included in the juvenile seat broken away, showing that the adjustable headrest also includes a slidable cradle retainer coupled to first and second shoulder straps included in a child-restraint harness and mounted for up-and-down sliding movement (with the head cradle) on the seat back;

FIG. 3 is an enlarged sectional view taken along line 3-3 of FIG. 1;

FIG. 4 is an enlarged sectional view taken along line 4-4 of FIG. 1;

FIG. 5C is an enlarged perspective assembly view of a portion of the seat back (on the right) and the slidable cradle retainer (on the left) and showing that the seat back is formed to include first and second belt-travel channels and that notched plates are coupled to the seat back to lie between the belt-travel channels and formed to include rod-receiving notches sized to receive therein the headrest-retainer rod and showing that a first Z-shaped load-receiver rail formed in the seat back along a right edge of the first (right-side) belt travel channel is arranged to mate with a companion first Z-shaped load-transfer flange included in the slidable cradle retainer to establish a first load-transfer path and that a second Z-shaped load-receiver rail formed in the seat back along a left edge of the second (left-side) belt-travel channel is arranged to mate with a companion second Z-shaped load-transfer flange included in the slidable cradle retainer to establish a second load-transfer path;

FIG. 6 is an enlarged view of the child restraint shown in FIG. 2 with portions broken away to show that the first and second stiffener beams are held in place in companion beam-receiver channels to cause the first stiffener beam to lie alongside the first Z-shaped load-receiver rail included in the seat back and to cause the second stiffener beam to lie alongside the second Z-shaped load-receiver rail in the seat back and showing that the seat shell includes a rearwardly extending first rib (on the right) that is formed to define the first beam-receiver channel and a rearwardly extending second rib (on the left) that is formed to define the second beam-receiver channel and showing that the slidable cradle retainer included in the adjustable headrest is mounted for up-and-down movement on the rearwardly facing first and second Z-shaped load-receiver rails in the seat back in a retainer-receiver channel provided between the first and second ribs to raise and lower shoulder straps included in the child-restraint harness and coupled to the slidable cradle retainer;

DETAILED DESCRIPTION

Figure 11:
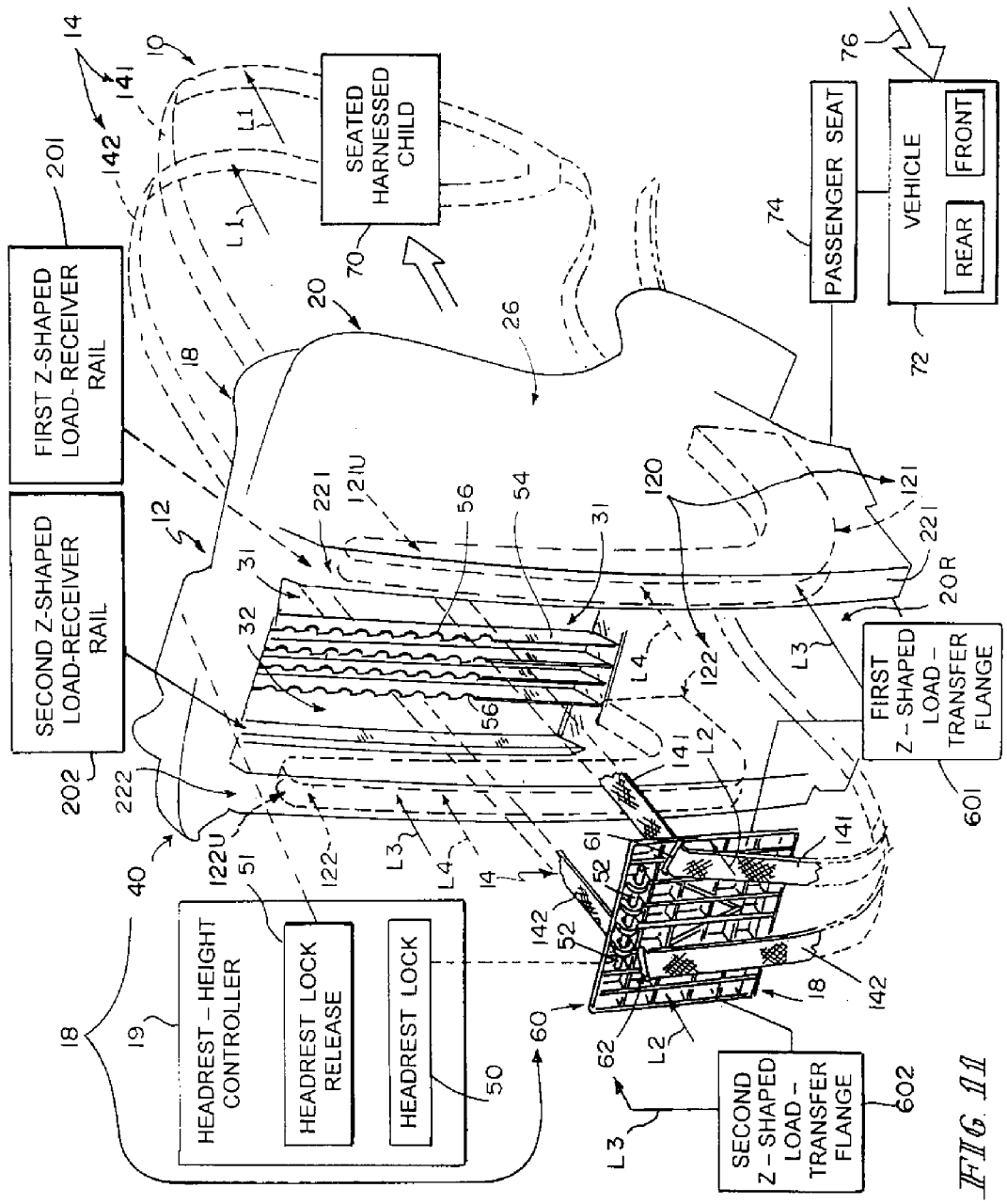
FIG. 11 is a diagrammatic perspective view showing several of the components included in the child restraint of FIG. 1 and suggesting that loads generated by movement of a child seated and harnessed on the juvenile seat relative to the juvenile seat during exposure of a vehicle carrying the juvenile seat will be transferred by the child-restraint harness, slidable cradle retainer, and seat shell to the first and second stiffener beams of the rigidified juvenile seat.

An illustrative child restraint 10 comprises a juvenile seat 12 and a child-restraint harness 14 as suggested in FIGS. 1, 2, and 11. Juvenile seat 12 includes a headrest 18 coupled to child-restraint harness 14 and mounted for movement on a seat shell 20 as suggested in FIGS. 1, 5, and 11.

Figure 5:
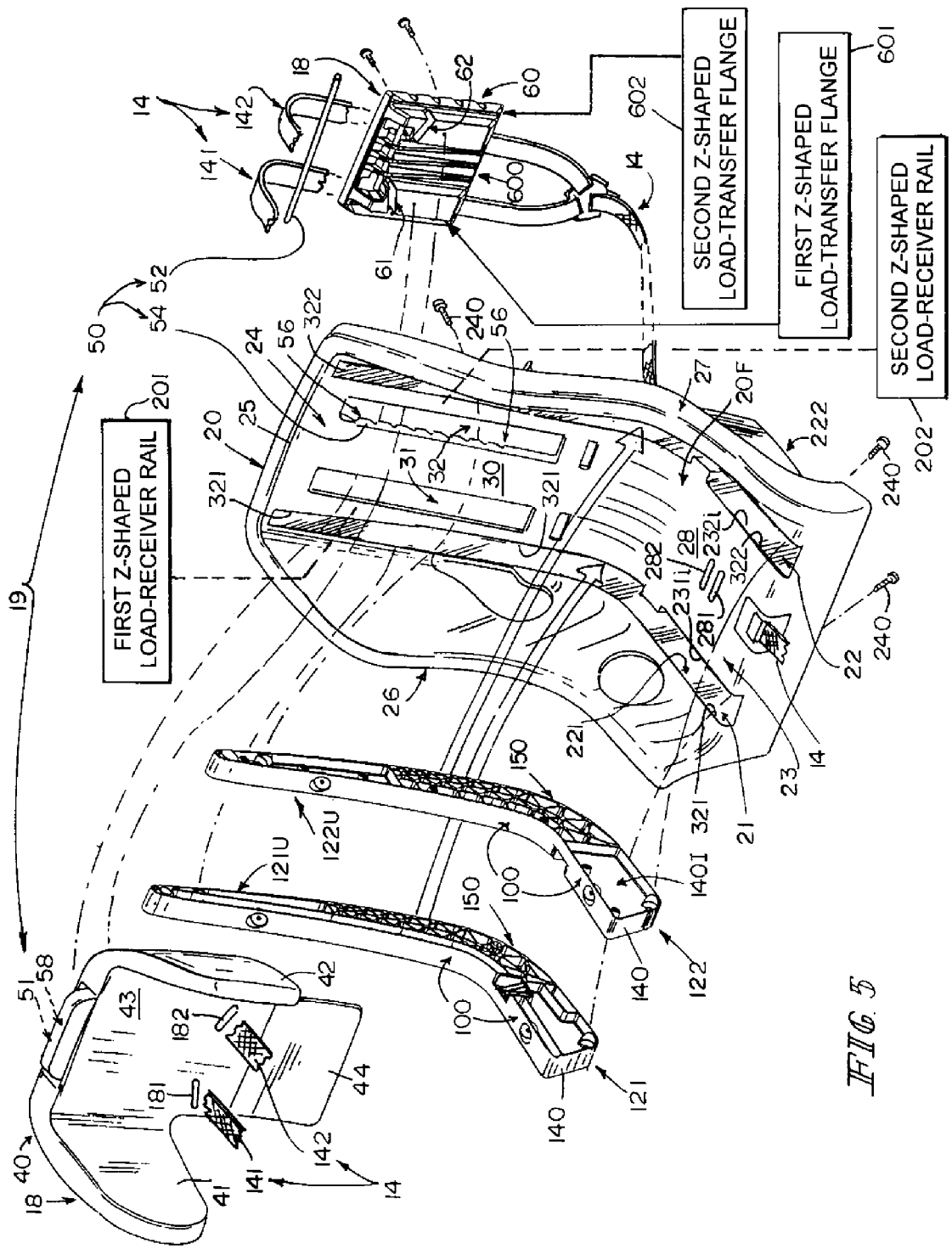
FIG. 5 is an exploded perspective assembly view showing many of the components included in the child restraint of FIG. 1 and showing J-shaped first and second stiffener beams that cooperate to form a shell-rigidifying system before they are placed in companion beam-receiver channels formed in the seat shell and retained in place using fasteners and showing (on the far right) the slidable cradle retainer included in the adjustable headrest (and coupled to a child-restraint harness) and provided with forwardly facing first and second Z-shaped load-transfer flanges that are configured to be mounted on a rearwardly facing first and second Z-shaped load-receiver rails included in the seat back as shown in FIG. 6 and suggesting that the slidable cradle retainer is fastened to the head cradle to move up and down therewith relative to the seat back of the seat shell.
Figure 5A:
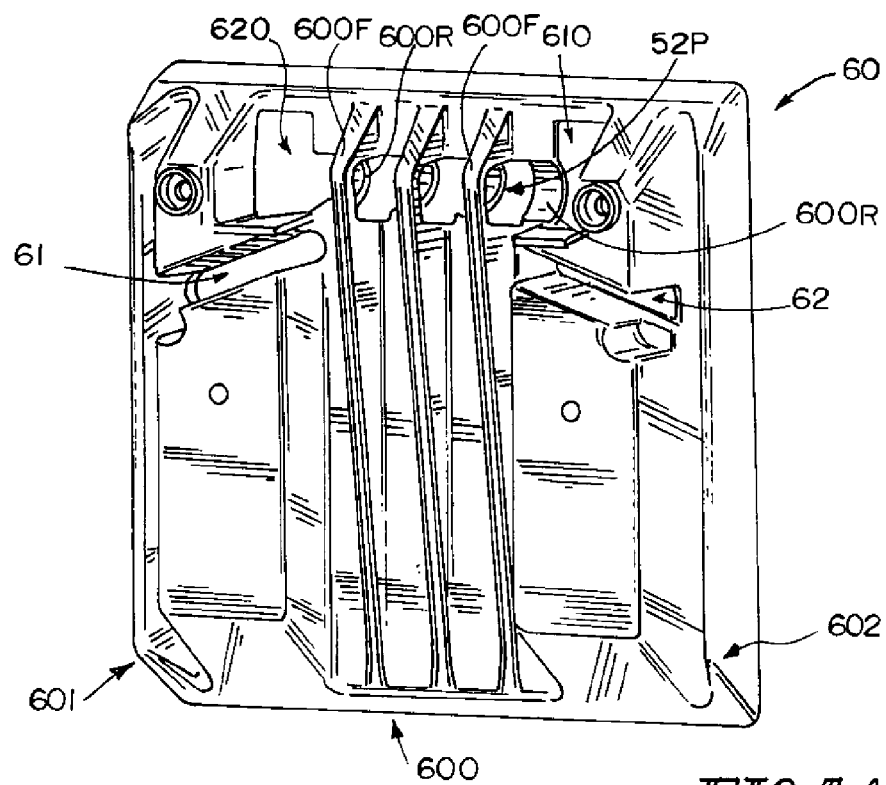
FIG. 5A is an enlarged front perspective view of the slidable cradle-retainer included in the adjustable headrest and shown in FIG. 5.

In illustrative embodiments, juvenile seat 12 further includes a shell-rigidifying system 120 comprising first and second stiffener beams 121, 122 sized to be retained in first and second beam-receiver channels 21, 22 formed in seat shell 20 as suggested in FIGS. 1, 2, and 5. As suggested diagrammatically in FIG. 11, headrest 18 is configured and arranged to transfer any load applied to child-restraint harness 14 as a result of movement of a seated and harnessed child 70 relative to seat shell 20 and the first and second stiffener beams 121, 122 coupled to seat shell 20 to provide a shell-rigidifying system 120 during exposure of a vehicle 72 carrying child restraint 10 to an external impact force 76.

Headrest 18 is coupled to first and second shoulder belts 141, 142 included in child-restraint harness 14 as suggested in FIGS. 1, 2, 5, and 11. Headrest 18 is mounted for up-and-down movement on a seat back 24 included in seat shell 20 so that the headrest 18 can be raised or lowered relative to a seat bottom 23 also included in seat shell 20 to a selected height position that is adapted and suited to cradle the heads of both smaller and larger juvenile occupants of juvenile seat 12. As headrest 18 is raised or lowered using a headrest-height controller 19 included in juvenile seat 12, the shoulder belts 141, 142 coupled to the headrest 18 move up and down therewith automatically so that the shoulder belts 141, 142 properly engage and restrain both smaller and larger juveniles.

A first load-transfer flange 601 included in headrest 18 is arranged to engage and slide on a companion first load-receiver rail 201 included in seat back 24 during up-and-down movement of headrest 18 relative to seat back 24 as suggested in FIGS. 5C, 6-8, and 11. Headrest 18 also includes a second load-transfer flange 602 arranged to engage and slide on a companion second load-receiver rail 202 included in seat back 24 during up-and-down movement of headrest relative to seat back 24 as also suggested in FIGS. 5C, 6-8, and 11. Flanges 601, 602 and rails 201, 202 are also shown diagrammatically in FIG. 5.

Figure 10:
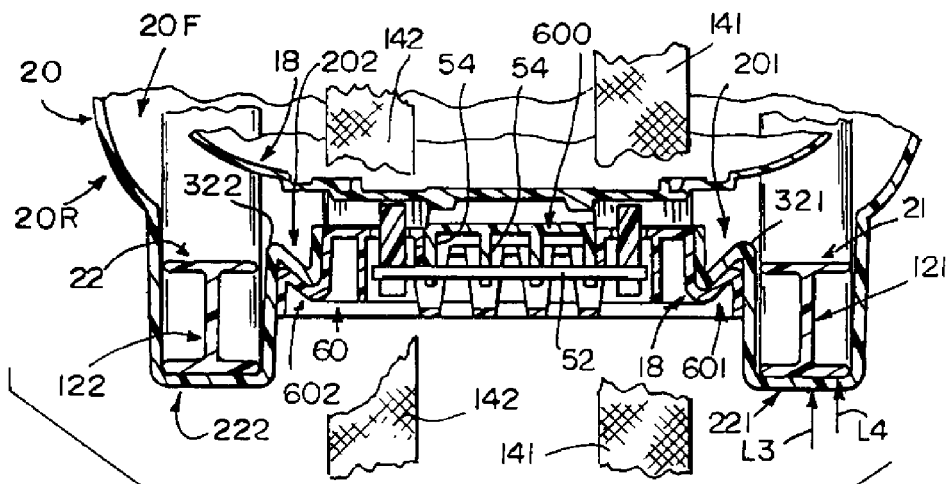
FIG. 10 is a sectional view taken along line 10-10 of FIG. 9 showing the location of the slidable cradle retainer between the first and second ribs (and the stiffener beams anchored in the beam-receiver channels formed in the ribs) and showing mating engagement of the first and second Z-shaped load-transfer flanges included in the slidable cradle retainer with the first and second Z-shaped load-receiver rails included in the seat back.
Figure 9:
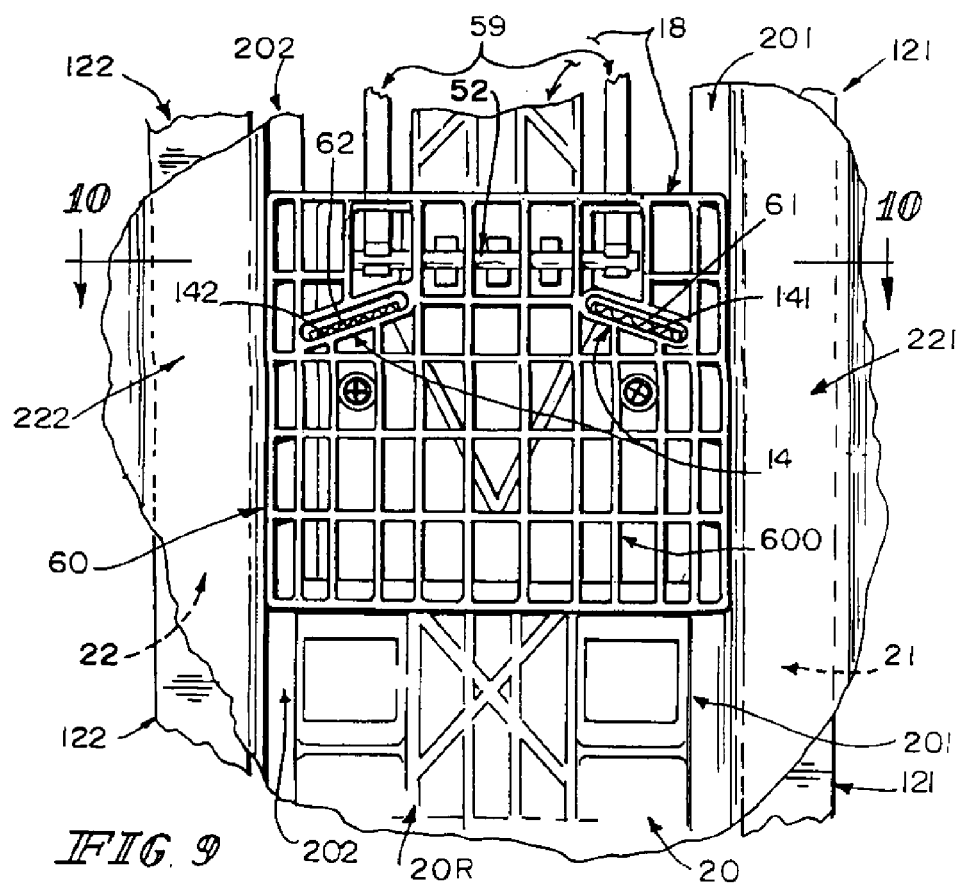
FIG. 9 is an enlarged rear elevation view of a portion of the child restraint of FIG. 2 showing that the slidable cradle retainer included in the headrest is formed to include a pair of angled, spaced-apart shoulder belt-receiving slots and is mounted for up-and-down movement with the head cradle relative to the seat back of the seat shell in the retainer-receiver channel defined between the two ribs that are formed in the seat shell to include the first and second beam-receiver channels and on the two Z-shaped load-receiver rails formed in the seat back.

In illustrative embodiments, loads applied by first and second shoulder belts 141, 142 to headrest 18 during exposure of a vehicle 72 carrying child restraint 10 to an external impact 76 as suggested in FIG. 11 are transferred to the shell-rigidifying system 120 that is coupled to seat shell 20 owing to mating engagement of headrest 18 and a rear side 20R of seat shell 20 in accordance with the present disclosure as suggested in FIGS. 6, 9, and 10. Headrest 18 is configured to provide means for (1) engaging child-restraint harness 14 to receive a load applied to child-restraint harness 14 by a child 70 seated and restrained on seat bottom 23 of juvenile seat 12 during movement of the seated child 70 relative to juvenile seat 12 in response to a sudden stop of a moving vehicle 72 carrying juvenile seat 12 and (2) transferring the load from headrest 18 to shell-rigidifying system 120 coupled to seat shell 20 as suggested diagrammatically in FIG. 11. In illustrative embodiments, that load is transferred via a first load-transfer path established by mating engagement of first load-transfer flange 601 included in headrest 18 and the companion first load-receiver rail 201 included in seat back 24 and arranged to extend alongside an upper portion of 121U of first stiffener beam 121 and via a second load-transfer path established by mating engagement of second load-transfer flange 602 included in headrest 18 and the companion second load-receiver rail 202 included in seat back 24 and arranged to extend alongside an upper portion 122U of second stiffener beam 122.

In illustrative embodiments, headrest 18 includes a head cradle 40 and a slidable cradle retainer 60 coupled to head cradle 40 to move therewith relative to a portion of the seat back 24 of seat shell 20 located between head cradle 40 and slidable cradle retainer 60 as suggested in FIG. 5. Head cradle 40 is supported for up-and-down movement along a forward facing side of seat back 24 and is configured to receive and cradle a head of a juvenile seated and restrained on seat bottom 23 as suggested in FIGS. 1 and 5. Slidable cradle retainer 60 includes spaced-apart first and second load-transfer flanges 601, 602 as shown, for example, in FIGS. 5, 5A, 5C, and 6-8. Slidable cradle retainer 60 is supported for up-and-down movement along a rearward facing side of seat back 24 as suggested in FIGS. 6, 9, 10, and 11.

Each of stiffener beams 121, 122 is inserted into one of the beam-receiver channels 21, 22 and then coupled to seat shell 20 using fasteners 240 as suggested in FIG. 5 to rigidify juvenile seat 12 as suggested in FIGS. 1-4 and 11. An upper portion 121U of first stiffener beam 121 is arranged to lie near and extend along first load-receiver rail 201 formed in seat back 24 as suggested in FIGS. 5C and 6. An upper portion 122U of second stiffener beam 122 is arranged to lie near and extend along second load-receiver rail 202 formed in seat back 24 as suggested in FIGS. 5C and 6.

Headrest-height controller 19 is coupled to headrest 18 and seat shell 20 and is configured to control the height of headrest 18 relative to seat shell 20. Headrest-height controller 19 includes an actuator handle 58 located near the top of headrest 18 as suggested in FIG. 2. Actuator handle 58 can be moved by a caregiver to release headrest 18 from a locked position on a seat back 24 of seat shell 20 so that headrest 18 can be raised or lowered on a seat back 24. It is within the scope of this disclosure to use any suitable headrest-height controller. As suggested in FIGS. 5C, 9, and 10, companion first load-transfer flange 601 and first load-receiver rail 201 remain in mating engagement and companion second load-transfer flange 602 and second load-receiver rail 202 remain in mating engagement regardless of the height position of headrest 18 on seat back 24.

Seat shell 20 includes a seat bottom 23 and a seat back 24 arranged to extend upwardly from seat bottom 23 and terminate at a top edge 25 as shown, for example, in FIG. 5. In illustrative embodiments, seat shell 20 also includes a first side-wing panel 26 coupled to one side of seat bottom 23 and seat back 24 and an opposing second side-wing panel 27 coupled to an opposite side of seat bottom 23 and seat back 24 as suggested in FIG. 5. Each of seat bottom 23 and seat back 24 is arranged to extend laterally between first and second side-wing panels 26, 27 and carry first and second stiffener beams 121, 122 as suggested in FIGS. 1 and 5.

In illustrative embodiments, seat shell 20 is a monolithic element made of a polypropylene material. A front side 20F of seat shell 20 is shown for example, in FIGS. 1 and 5. A rear side 20R of seat shell 20 is shown, for example, in FIGS. 2, 6, and 11. In illustrative embodiments, an outer fabric covering 29 included in juvenile seat 12 is mounted on seat shell 20 to cover seat shell 20 and first and second stiffener beams 121, 122 of shell-rigidifying system 120 as suggested in FIG. 1.

Seat shell 20 is formed to include rearwardly extending first and second ribs 221, 222 as shown, for example, in FIGS. 1-6. In illustrative embodiments, lower portions of ribs 221, 222 are formed in seat bottom 23 and upper portions of ribs 221, 222 are formed in seat back 24 as shown, for example, in FIGS. 1-5. As suggested in FIG. 5, seat bottom 23 also includes a seat pad 28 located between lower portions of first and second ribs 221, 222. Seat back 24 also includes a backrest 30 located between upper portions of first and second ribs 221, 222 as suggested in FIG. 5.

First rib 221 is formed to include first beam-receiver channel 21 as suggested in FIGS. 1-5. In illustrative embodiments, each of first rib 221, first stiffener beam 121, and first beam-receiver channel 21 is substantially J-shaped. As suggested in FIG. 5, seat bottom and back 23, 24 are formed to include an elongated aperture 321 opening into the first beam-receiver channel 21 formed in first rib 221 of seat shell 20. In illustrative embodiments, first beam-receiver channel 21 has an opening formed in front side 20F of seat shell 20 as suggested in FIG. 5. As suggested in FIG. 5, during assembly of components included in juvenile seat 12, first stiffener beam 121 is inserted into first beam-receiver channel 21 and held in a stationary position therein by means of fasteners 240 coupled to first stiffener beam 121 and seat shell 20.

Second rib 222 is formed to include second beam-receiver channel 22 as suggested in FIGS. 1-5. In illustrative embodiments, each of second rib 222, second stiffener beam 122, and second beam-receiver channel 22 is substantially J-shaped. As suggested in FIG. 5, seat bottom and back 23, 24 are formed to include an elongated aperture 322 opening into the second beam-receiver channel 22 formed in second rib 222 of seat shell 20. In illustrative embodiments, second beam-receiver channel 22 has an opening formed in front side 20F of seat shell 20 as suggested in FIG. 5. As suggested in FIG. 5, second stiffener beam 122 is inserted into second beam-receiver channel 22 during manufacture of juvenile seat 12 and held in a stationary position therein by means of fasteners 240 coupled to second stiffener beam 22 and seat shell 20.

A seat pad 28 included in seat bottom 23 is visible on front side 20F of seat shell 20 as suggested in FIG. 5. Seat pad 28 lies between lower portions of first and second beam-receiver channels 21, 22 and extends laterally from an inner edge 231i bordering aperture 321 associated with first beam-receiver channel 21 to an inner edge 232i bordering aperture 322 associated with second beam-receiver channel 22 as suggested in FIG. 5. Seat pad 28 is formed to include several crotch belt-receiving slots 281, 282 as suggested in FIG. 5.

Backrest 30 included in seat back 24 is visible on front side 20F of seat shell 20 as suggested in FIG. 5. Backrest 30 lies between upper portions of first and second beam-receiver channels 21, 22 and extends laterally from inner edge 231i bordering aperture 321 associated with first beam-receiver channel 21 to inner edge 232i bordering aperture 322 associated with second beam-receiver channel 22 as suggested in FIG. 5.

Each of first and second stiffener beams 121, 122 is substantially J-shaped to resemble a hockey stick as shown, for example, in FIG. 5. A lower portion 121L, 122L of each of first and second stiffener beams 121, 122 is a forwardly and generally horizontally extending blade. An upper portion 121U, 122U of each of first and second stiffener beams 121, 122 is an upwardly extending handle coupled to a rear end of a companion blade and arranged to cooperate with the companion blade to define an obtuse included angle 100 of about 100° therebetween as suggested in FIG. 5. Each stiffener beam 121, 122 is made of a polypropylene material in an illustrative embodiment.

Each of first and second stiffener beams 121, 122 includes a perimeter flange 140 and a rigidifying structure 150. Perimeter flange 140 is formed to include an interior space 140I bounded by perimeter flange 140 as suggested in FIG. 5. Rigidifying structure 150 is located in interior space 140I and coupled to perimeter flange 140.

As suggested in FIG. 5, headrest 18 includes a head cradle 40 and a slidable cradle retainer 60. Cradle retainer 60 is coupled to head cradle 40 to move therewith relative to seat back 24 and to retain head cradle 40 in tethered relation to seat back 24 while allowing up-and-down movement of head cradle 40 relative to seat back 24.

Backrest 30 is formed to include a pair of upwardly extending and laterally spaced-apart belt-travel channels 31, 32 shown, for example, in FIGS. 1, 5, and 11. These belt-travel channels 31, 32 are provided so that shoulder belts 141, 142 in child-restraint harness 14 can pass between front and rear sides 20F, 20R of seat shell 20. Headrest 18 is aligned with seat back 24 so that belt-receiving slots 181, 182 formed in head cradle 40 and belt-receiving slots 61, 62 formed in slidable cradle retainer 60 of headrest 18 are always aligned with belt-travel channels 31, 32 formed in backrest 30 regardless of the position of headrest 18 on seat back 24.

A first shoulder belt 141 included in child-restraint harness 14 is arranged to extend through first belt-travel channel 31 as suggested in FIGS. 5 and 11. First shoulder belt 141 is also arranged to extend through a first shoulder belt-receiving slot 181 formed in head cradle 40 of headrest 18 as suggested in FIG. 5 and through a first shoulder belt-receiving slot formed in slidable cradle retainer 60 of headrest 18 as suggested in FIGS. 2, 6, and 11.

Figure 12:
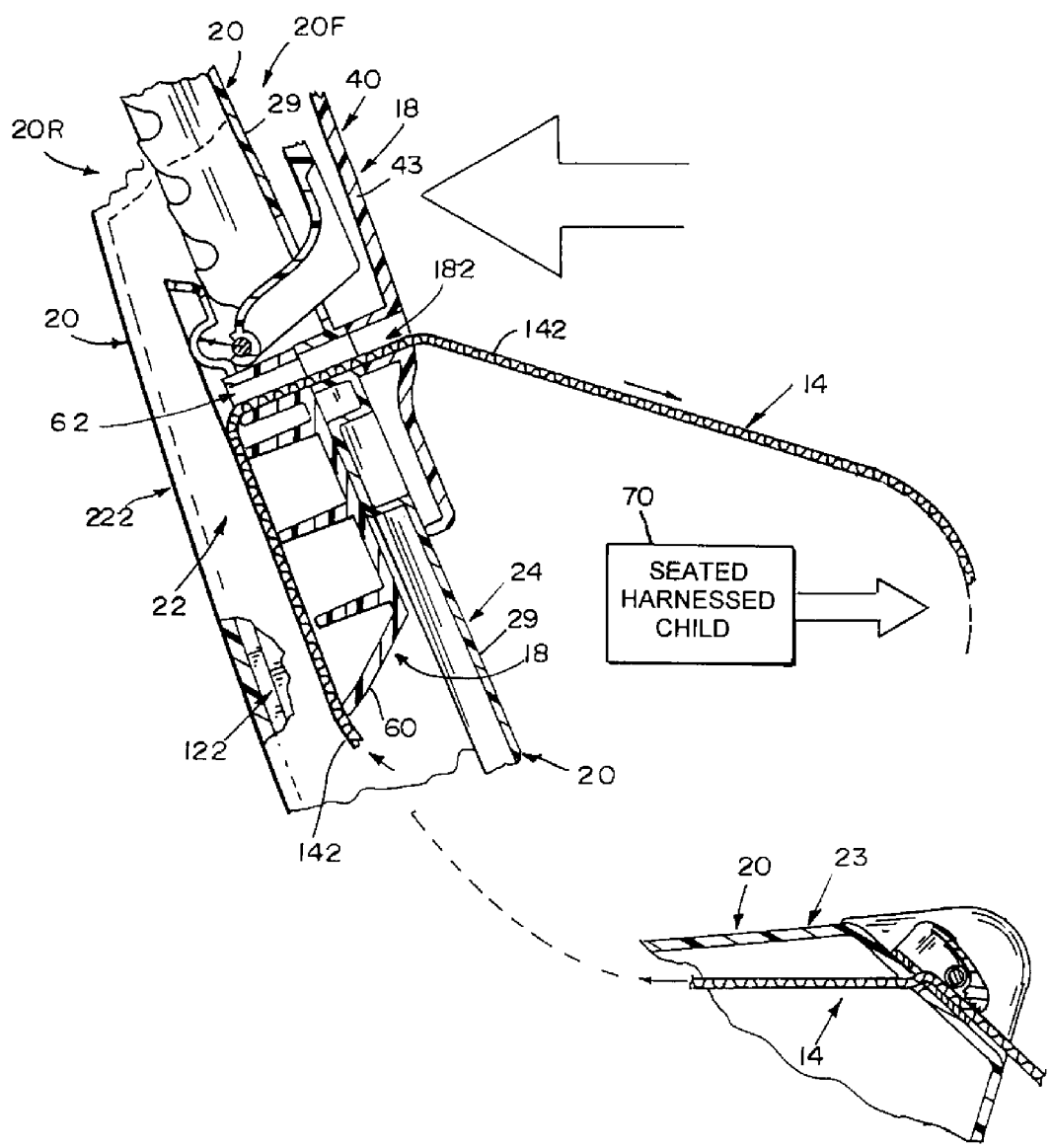
FIG. 12 is an enlarged partial sectional view taken along line 12-12 of FIG. 1, with portions broken away to show the first stiffener beam mounted in the first beam-receiver channel formed in the first upright rib included in the seat shell.

A second shoulder belt 142 included in child-restraint harness 14 is arranged to extend through second belt-travel channel 32 as suggested in FIG. 5. Second shoulder belt 142 is also arranged to extend through a second shoulder belt-receiving slot 182 formed in head cradle 40 of headrest 18 as suggested in FIGS. 5 and 12 and through a second shoulder belt-receiving slot 62 formed in slidable cradle retainer 60 of headrest 18 as suggested in FIGS. 2, 6, and 11.

Head cradle 40 of headrest 18 includes a harness-control panel 43 formed to include first and second belt-receiving slots 181, 182 as shown, for example, in FIG. 5. A plate mount 44 is coupled to harness-control panel 43 and arranged to extend downwardly toward seat bottom 23. Head cradle 40 also includes a first side wing 41 coupled to one side of harness-control panel 43 and a second side wing 42 coupled to another side of harness-control panel 43 as suggested in FIG. 5. Illustratively, a head of a child seated on juvenile seat 12 is positioned to lie between first and second side wings 41, 42 on harness-control panel 43.

An energy-dissipation system 16 is included in child restraint 10 as suggested in FIG. 1. In an illustrative embodiment, energy-dissipation system 16 comprises a first pair of air-filled ride-down pads 161 coupled to first side wing 41 of head cradle 40 in headrest 18 and a second pair of air filled ride-down pads 162 coupled to second wing 42 of head cradle 40. It is within the scope of this disclosure to mount any suitable pads or cushions on head cradle 40 to move up and down therewith.

Headrest 18 is mounted for up-and-down movement on seat back 24 of seat shell 20. The first and second shoulder belt-receiving slots 181, 182 of harness-control panel 43 of head cradle 40 and the first and second shoulder belt-receiving slots 61, 62 formed in slidable cradle-retainer plate 60 are aligned with their companion belt-travel channels 31, 32 formed in backrest 30 of seat back 24 as suggested in FIG. 5. Shoulder belt-receiving slots 181, 182 formed in head cradle 40 and shoulder belt-receiving slots 61, 62 formed in slidable cradle retainer 60 operate to keep shoulder belts 141, 142 positioned at an appropriate height that corresponds to the vertical position of headrest 18 relative to seat back 24 that has been selected by the caregiver.

Child-restraint harness 14 is used to restrain a child sitting on seat shell 20. Child-restraint harness 14 in an illustrative embodiment is configured to include shoulder belts 141, 142, a crotch belt 143, and thigh belts (not shown). Belt-travel channels 31, 32 formed in backrest 30 allow shoulder belts 141, 142 to move with headrest 18 along the length of seat back 24 and relative to seat bottom 23 between raised and lowered positions.

Headrest-height controller 19 is included in juvenile seat 12 and is shown diagrammatically in FIG. 1. Headrest-height controller 19 is configured and arranged to vary the height of headrest 18 above seat bottom 23 at the option of a caregiver. An illustrative headrest-height controller 19 includes a headrest lock 50 and a headrest-lock release 51.

Figure 5B:
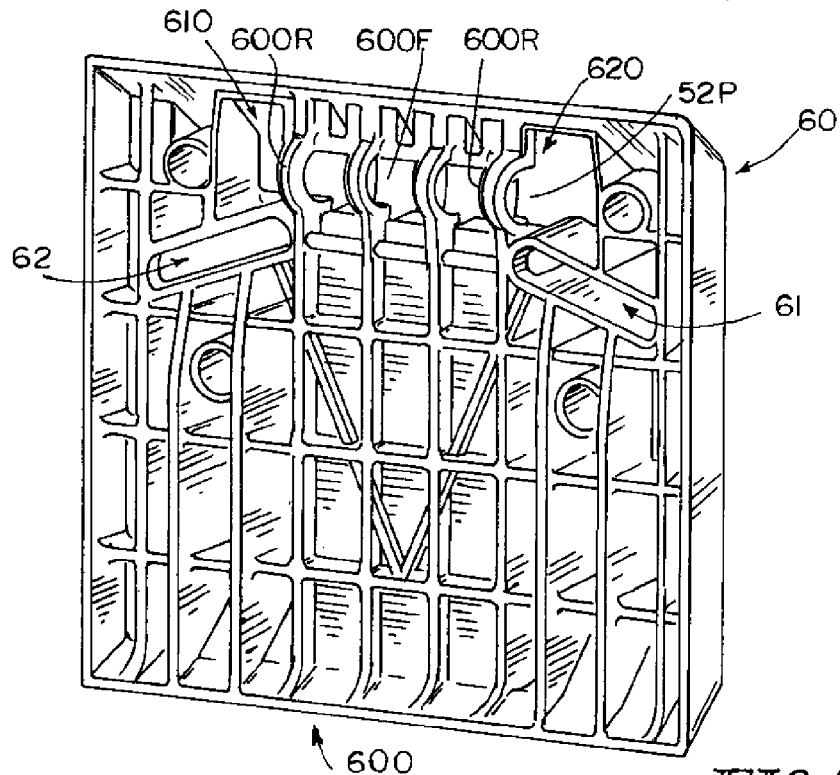
FIG. 5B is a rear perspective view of the slidable cradle retainer of FIG. 5A.
Figure 5D:
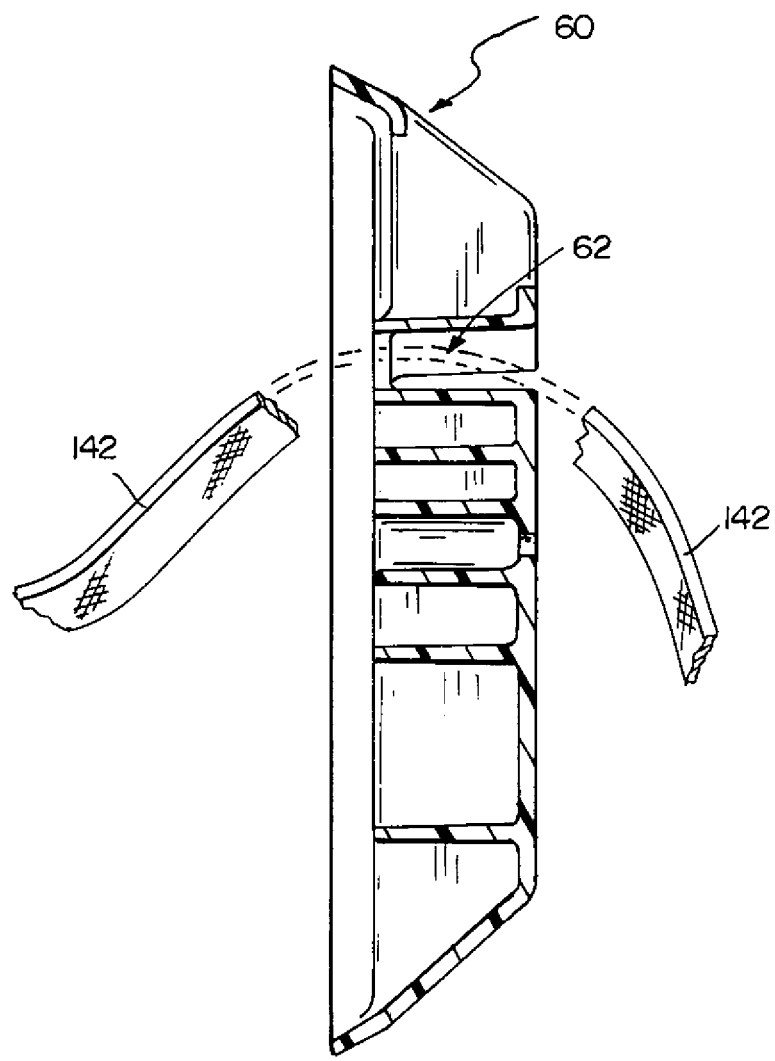
FIG. 5D is an enlarged sectional view taken along line 5D-5D of FIG. 5C.

Headrest lock 50 comprises a movable headrest-retainer rod 52 and one or more upwardly extending notched plates 54 coupled to seat back 24. Each notched plate 54 is formed to include a series of companion rod-receiving notches 56 as suggested in FIG. 5. Headrest retainer rod 52 is sized and shaped to extend through a rod-receiver passageway 52P formed in an upper portion of a central bed 600 provided in cradle retainer 60 as suggested in FIGS. 5A-C. Central bed 600, for example, includes several forwardly extending arch-shaped strips 600F and several rearwardly extending arch-shaped strips 600R that are arranged to lie in laterally spaced-apart, alternating, serial relation to one another as suggested in FIGS. 5A and 5B to cooperate to define rod-receiver passageway 52P therebetween. Central bed 600 is also formed to include a first opening 610 at one end of rod-receiver passageway 52P and a second opening 620 at an opposite end of rod-receiver passageway 52 as shown, for example, in FIGS. 5A and 5B.

Headrest-lock release 51 comprises a movable actuator handle 58 (see FIGS. 2 and 6) and suitable linkage means 59 (see FIGS. 9 and 10) interconnecting handle 58 and headrest-retainer rod 52 for selectively moving headrest-retainer rod 52 away from seat back 24 (at the option of a caregiver) to disengage rod-receiving notches 56 to free headrest 18 to be moved up or down on seat back 24 between raised and lowered positions in response to movement of actuator handle 58 relative to seat back 24 of seat shell 20 by a caregiver. Whenever headrest-retainer rod 52 is deposited by headrest-lock release 51 into rod-receiving notches 56, headrest 18 is retained in a selected stationary position above seat bottom 23 of seat shell 20.

Reference is hereby made to U.S. application Ser. No. 12/726,128, filed on Mar. 17, 2010, which reference is hereby incorporated in its entirety herein, for disclosures relating to headrest-height controllers. In an illustrative process, a caregiver can operate headrest-height controller 19 to unlock and lock headrest 18 so as to change the height of headrest 18 above seat bottom 23. A caregiver can squeeze or otherwise move handle 58 toward seat shell 20 to cause linkage means 59 to move headrest-retainer rod 52 relative to notched plates 54 and cradle retainer 60 to disengage notches 56 formed in notched plates 54. Then the caregiver can lift headrest 18 to a higher position on seat back 24 or drop headrest 18 to a lower position on seat back 24 and then release actuator handle 58 to allow linkage means 59 to move (under, e.g., a spring force) to place headrest-retainer rod 52 in another of the notches 56 corresponding to a selected height above seat bottom 23.

The slidable cradle retainer 60 of headrest 18 is configured and arranged to assist in transferring loads applied to child-restraint harness 14 by a child 70 seated in juvenile seat 12 to first and second stiffener beams 121, 122 of juvenile seat 12 during exposure of a vehicle 72 having a passenger seat 74 carrying juvenile seat 12 to an external impact force 76 as suggested in FIG. 11. During such an event, relative movement of the seated harnessed child 70 and juvenile seat causes, in series (1) a load L1 to be applied by child 70 to first and second shoulder belts 141, 142; (2) a load L2 to be applied by belts 141, 142 to slidable cradle retainer 60 of headrest 18; (3) a load L3 to be applied by first and second load-transfer flanges 601, 602 of slidable cradle retainer 60 to companion first and second load-receiver rails 201, 202 of seat shell 20; and (4) a load L4 to be applied by first and second ribs 221, 222 of seat shell 20 to companion first and second stiffener beams 121, 122 as suggested diagrammatically in FIG. 11. As such, the shell-rigidifying system 120 provided, for example, by first and second stiffener beams 121, 122, is configured to carry loads applied to juvenile seat 12 during exposure of juvenile seat 12 to an external impact force 76.

As shown in FIG. 6, slidable cradle retainer 60 of headrest 18 includes a central bed 600 formed to include first and second belt-receiving slots 61, 62 and first and second Z-shaped load-transfer flanges 601, 602. First Z-shaped load-transfer flange 601 is coupled to one side of central bed 600 and arranged to mate with and slide on a complementary companion first Z-shaped load-transfer rail 201 included in seat shell 20 and arranged to lie next to first rib 221 as suggested in FIGS. 9 and 10. Second Z-shaped load-transfer flange 602 is coupled to an opposite side of central bed 600 and arranged to mate with and slide on a complementary companion second Z-shaped load-transfer rail 202 included in seat shell 20 and arranged to lie next to second rib 221 as suggested in FIGS. 9 and 10.

Figure 8:
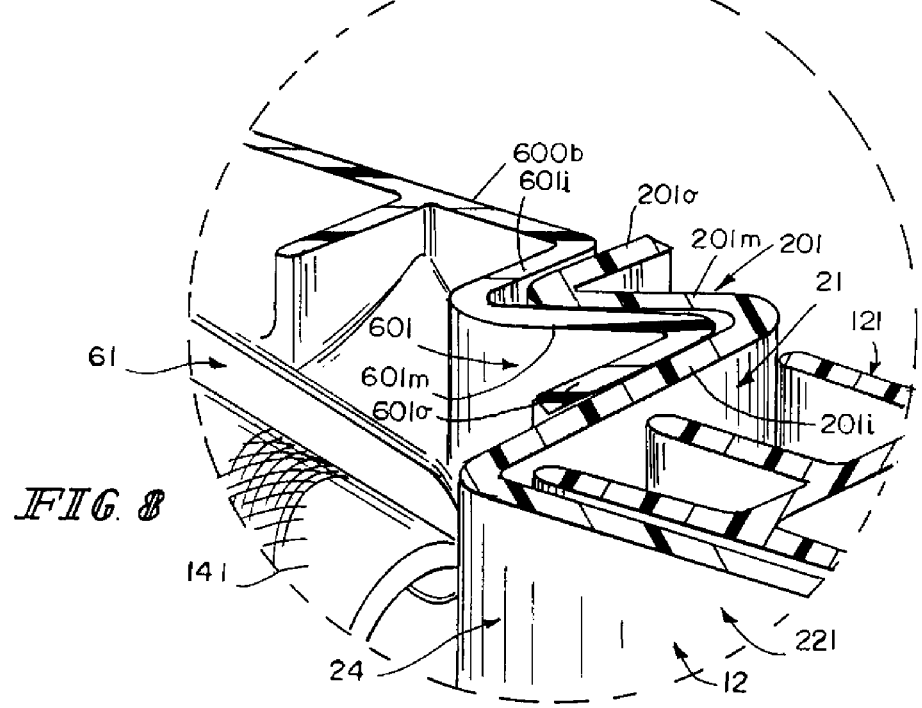
FIG. 8 is an enlarged partial perspective view taken from a circled region of FIG. 6 showing mating engagement of a second Z-shaped load-transfer flange on a near side of the slidable cradle retainer with a second Z-shaped load-receiver rail formed in the seat shell and located near a second shoulder strap and a portion of the second stiffener beam.

First load-transfer flange 601 includes inner, middle, and outer flange segments 601$i$, 601$m$, and 601$o$ as shown, for example, in FIG. 8. Inner (first) flange segment 601$i$ is perpendicular to a base plate 600$b$ included in central bed 600. Outer (third) segment 601$i$ is arranged to lie in spaced-apart parallel relation to inner flange segment 601$i$ and between inner flange segment 601$i$ and first stiffener beam 121 as suggested in FIG. 8. Middle (second) flange segment 601$m$ interconnects inner and outer flange segments 601$i$, 601$o$ and cooperates with those flange segments to provide first load-transfer flange 601 with a Z-shaped cross-sectional shape characterized by congruent alternate interior acute angles defined between middle flange segment 601$m$ and each of inner and outer flange segments 601$i$ and 601$o$ as suggested in FIG. 8.

First load-receiver rail 201 includes inner, middle, and outer rail segments 201$i$, 201$m$, and 201$o$ as shown, for example, in FIG. 8. Inner (first) rail segment 201$i$ is coupled to first rib 221 and arranged to engage outer flange segment 601$o$ of first load-transfer flange 601. Outer (third) rail segment 201$o$ is arranged to lie in spaced-apart parallel relation to inner rail segment 201$i$ and engage inner flange segment 601$i$ of first load-transfer flange 601. Middle (second) rail segment 201$m$ is arranged to interconnect inner and outer rail segments 201$i$, 201$m$ and engage middle flange segment 601$m$ of first load-transfer flange 601. Rail segments 201$i$, 201$m$, and 201$o$ cooperate to provide first load-receiver rail 201 with a Z-shaped cross-sectional shape characterized by congruent alternate interior acute angles defined between middle rail segment 201$m$ and each of inner and outer rail segments 201$i$ and 201$o$ as suggested in FIG. 8.

Figure 7:
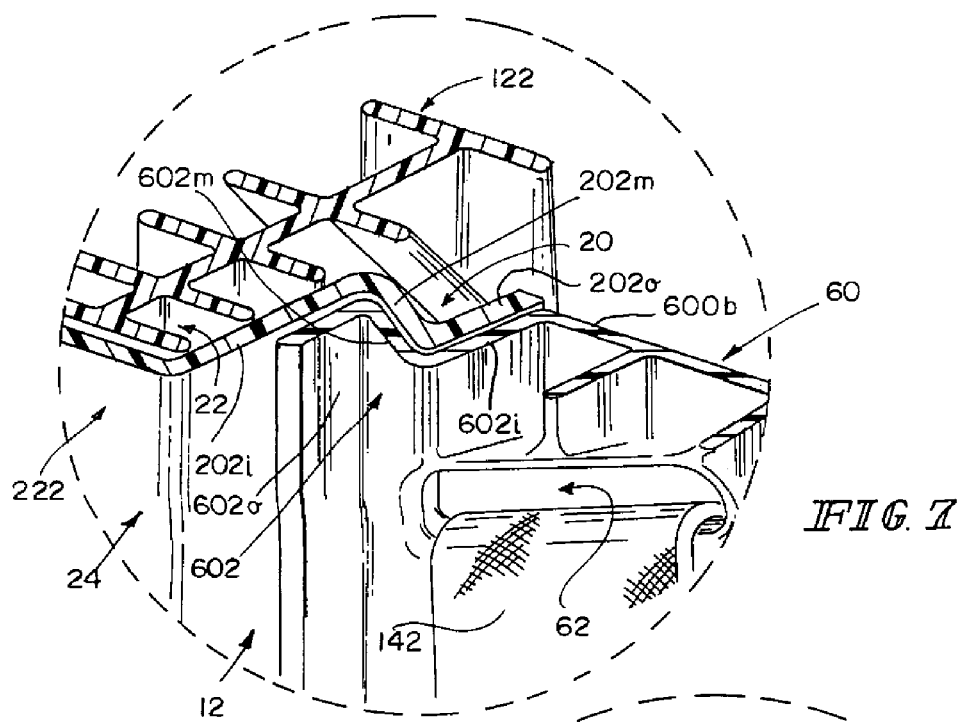
FIG. 7 is an enlarged partial perspective view taken from a circled region of FIG. 6 showing mating engagement of a first Z-shaped load-transfer flange on a far side of the slidable cradle retainer with a first Z-shaped load-receiver rail formed in the seat shell and located near a first shoulder strap and a portion of the first stiffener beam.

Second load-transfer flange 602 includes inner, middle, and outer flange segments 602$i$, 602$m$, and 602$o$ as shown, for example, in FIG. 7. Inner (first) flange segment 602$i$ is perpendicular to a base plate 600$b$ included in central bed 600 and arranged to lie in spaced-apart parallel relation to inner flange segment 601$i$ of first load-transfer flange 601 as suggested in FIGS. 7 and 8. Outer (third) flange segment 602$i$ is arranged to lie in spaced-apart parallel relation to inner flange segment 602$i$ and between inner flange segment 602$i$ and second stiffener beam 122 as suggested in FIG. 7. Middle (second) flange segment 602$m$ interconnects inner and outer flange segments 602$i$, 602$o$ and cooperates with those segments to provide second load-transfer flange 602 with a Z-shaped cross-sectional shape characterized by congruent alternate interior acute angles defined between middle flange segment 602$m$ and each of inner and outer flange segments 02$i$ and 602$o$ as suggested in FIG. 7.

Second load-receiver rail 202 includes inner, middle, and outer rail segments 202$i$, 202$m$, and 202$o$ as shown, for example, FIG. 7. Inner (first) rail segment 202$i$ is coupled to second rib 222 and arranged to engage outer flange segment 602$o$ of second load-transfer flange 602. Outer (third) rail segment 202$o$ is arranged to lie in spaced-apart parallel relation to inner rail segment 202$i$ and engage inner flange segment 602$i$ of second load-transfer flange 602. Middle (second) rail segment 202$m$ is arranged to interconnect inner and outer rail segments 202$i$, 202$m$ and engage middle flange segment 602$m$ of second load-transfer flange 602. Rail segments 202$i$, 202$m$, and 202$o$ cooperate to provide second load-receiver rail 202 with a Z-shaped cross-sectional shape characterized by congruent alternate interior acute angles defined between middle rail segment 202$m$ and each of inner and outer rail segments 202$i$ and 202$o$ as suggested in FIG. 7.

The location of slidable cradle retainer 60 between first and second ribs 221, 222 and first and second stiffener beams 121, 122 anchored in beam-receiver channels 21, 22 formed in ribs 221, 222 is shown, for example, in FIG. 10. Also, mating engagement of slidable cradle retainer 60 with first and second Z-shaped load-receiver rails 201, 202 included in seat shell 20 is shown in FIGS. 8, 9, and 10. A diagrammatic perspective view provided in FIG. 11 shows several of the components included in child restraint 10 and suggests that loads generated by movement of a child 70 seated and harnessed on juvenile seat 12 during exposure of a vehicle 72 carrying juvenile seat 12 will be transferred by child-restraint harness 14, slidable cradle retainer 60, and seat shell 20 to first and second stiffener beams 121, 122 of the rigidified juvenile seat 12.

The invention claimed is:
1. A child restraint comprising
a juvenile seat including a seat bottom and a seat back arranged to extend upwardly from the seat bottom and formed to include first and second belt-travel channels, wherein a first load-receiver rail is included in the seat back and arranged to extend along an edge of the first belt-travel channel and a second load-receiver rail is included in the seat back and arranged to extend along an edge of the second belt-travel channel, a child-restraint harness coupled to the juvenile seat and configured to restrain a child seated on the seat bottom, the child-restraint harness including a first shoulder belt arranged to pass through the first belt-travel channel and a second shoulder belt arranged to pass through the second belt-travel channel, and a headrest coupled to the first and second shoulder belts of the child-restraint harness and mounted for up-and-down movement on the seat back, wherein the headrest includes a head cradle located on a front side of the seat back and above the seat bottom and a cradle retainer located on an opposite rear side of the seat back and coupled to the head cradle to move therewith relative to the seat back during up-and-down movement of the headrest at the option of a caregiver, the cradle retainer is coupled to the first and second shoulder belts, the cradle retainer includes a first load-transfer flange that is arranged to engage and slide on the first load-receiver rail during up-and-down movement of the headrest to establish a first load-transfer path from the cradle retainer to the seat back, and the cradle retainer also includes a second load-transfer flange that is arranged to engage and slide on the second load-receiver rail during up-and-down movement of the headrest to establish a second load-transfer path from the cradle retainer to the seat back.

2. The child restraint of claim 1, wherein the seat bottom and seat back cooperate to form a seat shell, the seat shell includes a first rib formed to include a first beam-receiver channel and a second rib formed to include a second beam-receiver channel, the seat back further includes a backrest arranged to interconnect the first and second ribs, the juvenile seat further includes a shell-rigidifying system including a first stiffener beam located in the first beam-receiver channel and coupled to the seat shell and a second stiffener beam located in the second beam-receiver channel and coupled to the seat shell, the first load-receiver rail is coupled to the first rib, and the second load-receiver rail is coupled to the second rib and arranged to lie in spaced-apart relation to the first rib to locate the cradle retainer in a slidable position on the first and second load-receiver rails between the first and second ribs.

3. The child restraint of claim 2, wherein the cradle retainer further includes a central bed arranged to interconnect the first and second load-transfer flanges and formed to include a first belt-receiving slot receiving the first shoulder belt and a second belt-receiving slot receiving the second shoulder belt, the first load-transfer flange includes inner, middle, and outer flange segments, the inner flange segment is coupled to the central bed, the outer flange segment is arranged to lie in spaced-apart relation to the inner flange segment and between the inner flange segment and the first stiffener beam, and the middle flange segment is arranged to interconnect the inner and outer flange segments.

4. The child restraint of claim 3, wherein the first load-receiver rail includes inner, middle, and outer rail segments, the inner rail segment is coupled to the first rib and arranged to engage the outer flange segment of the first load-transfer flange, the outer rail segment is arranged to lie in spaced-apart relation to the inner rail segment and engage the inner flange segment of the first load-transfer flange, and the middle rail segment is arranged to interconnect the inner and outer rail segments and engage the middle flange segment of the first load-transfer flange.

5. The child restraint of claim 4, wherein the inner, middle, and outer flange segments of the first load-transfer flange cooperate to provide the first load-transfer flange with a Z-shaped cross-sectional shape and the inner, middle, and outer flange segments of the first load-receiver rail cooperate to provide the first load-receiver rail with a Z-shaped cross-sectional shape.

6. The child restraint of claim 4, wherein inner and outer flange segments of the first load-transfer flange and the inner and outer rail segments of the first load-receiver rail are arranged to lie in substantially parallel relation to one another.

7. The child restraint of claim 4, wherein the middle flange segment of the first load-transfer flange and the middle rail segment of the first load-receiver rail are arranged to lie in substantially parallel relation to one another.

8. The child restraint of claim 3, wherein the inner and outer flange segments of the first load-transfer flange are arranged to lie in substantially parallel relation to one another.

9. The child restraint of claim 3, wherein the inner, middle, and outer flange segments of the first load-transfer flange cooperate to provide the first load-transfer flange with a Z-shaped cross-sectional shape.

10. The child restraint of claim 3, wherein the second load-transfer flange includes inner, middle, and outer flange segments, the inner flange segment of the second load-transfer flange is coupled to the central bed and arranged to lie in spaced-apart relation to the inner flange segment of the first load-transfer flange to locate the central bed therebetween, the outer flange segment of the second load-transfer flange is arranged to lie in spaced-apart relation to the inner flange segment of the second load-transfer flange and between the inner flange segment of the second load-transfer flange and the second stiffener beam, and the middle flange segment of the second load-transfer flange is arranged to interconnect the inner and outer flange segments of the second load-transfer flange.

11. The child restraint of claim 10, wherein the first load-receiver rail includes inner, middle, and outer rail segments, the inner rail segment is coupled to the first rib and arranged to engage the outer flange segment of the first load-transfer flange, the outer rail segment is arranged to lie in spaced-apart relation to the inner rail segment and engage the inner flange segment of the first load-transfer flange, and the middle rail segment is arranged to interconnect the inner and outer rail segments and engage the middle flange segment of the first load-transfer flange and wherein the second load-receiver rail includes inner, middle, and outer rail segments, the inner rail segment of the second load-receiver rail is coupled to the second rib and arranged to engage the outer flange segment of the second load-transfer flange, the outer rail segment of the second load-receiver rail is arranged to lie in spaced-apart relation to the inner rail segment of the second load-receiver rail and engage the inner flange segment of the second load-transfer flange, and the middle rail segment of the second load-receiver rail is arranged to interconnect the inner and outer rail segments of the second load-receiver rail and engage the middle flange segment of the second load-transfer flange.

12. The child restraint of claim 11, wherein the inner, middle, and outer flange segments of the first load-transfer flange cooperate to provide the first load-transfer flange with a Z-shaped cross-sectional shape and the inner, middle, and outer flange segments of the first load-receiver rail cooperate to provide the first load-receiver rail with a Z-shaped cross-sectional shape and wherein the inner, middle, and outer flange segments of the second load-transfer flange cooperate to provide the second load-transfer flange with a Z-shaped cross-sectional shape and the inner, middle, and outer flange segments of the second load-receiver rail cooperate to provide the second load-receiver rail with a Z-shaped cross-sectional shape.

13. The child restraint of claim 11, wherein inner and outer flange segments of the first load-transfer flange and the inner and outer rail segments of the first load-receiver rail are arranged to lie in substantially parallel relation to one another and wherein inner and outer flange segments of the second load-transfer flange and the inner and outer rail segments of the second load-receiver rail are arranged to lie in substantially parallel relation to one another.

14. The child restraint of claim 11, wherein the middle flange segment of the first load-transfer flange and the middle rail segment of the first load-receiver rail are arranged to lie in substantially parallel relation to one another and wherein the middle flange segment of the second load-transfer flange and the middle rail segment of the second load-receiver rail are arranged to lie in substantially parallel relation to one another.

15. The child restraint of claim 10, wherein the inner and outer flange segments of the second load-transfer flange are arranged to lie in substantially parallel relation to one another.

16. The child restraint of claim 10, wherein the inner, middle, and outer flange segments of the second load-transfer flange cooperate to provide the second load-transfer flange with a Z-shaped cross-sectional shape.

17. The child restraint of claim 2, wherein the first load-receiver rail includes a first rail segment coupled to the first rib and a second rail segment coupled to the first rail segment and arranged to define an acute angle and an outer notch therebetween and the first load-transfer flange includes an outer flange slider arranged to extend into the outer notch and slide on the first and second rail segments of the first load-receiver rail during up-and-down movement of the headrest relative to the seat back.

18. The child restraint of claim 17, wherein second and third flange segments included in the load-transfer flange are arranged to cooperate to define an acute angle therebetween and to form the outer flange slider, the second flange segment is arranged to engage the second rail segment, and the third flange segment is arranged to engage the first rail segment.

19. The child restraint of claim 18, wherein the cradle retainer further includes a central bed arranged to interconnect the first and second load-transfer flanges and the first load-transfer flange further include a first flange segment arranged to interconnect the central bed and the second flange segment and cooperate with the second flange segment to form an inner notch therebetween, the first load-receiver rail further includes a third rail segment coupled to the second rail segment to form a flange-segment foundation arranged to extend into the inner notch and engage the first and second flange segments and support an inner flange slider defined by the first and second flange segments during up-and-down movement of the headrest relative to the seat back.

20. The child restraint of claim 19, wherein the first and second flange segments included in the load-transfer flange cooperate to define an acute included angle therebetween.

21. A child restraint comprises
a juvenile seat including a seat bottom and a seat back arranged to extend upwardly from the seat bottom and formed to include first and second substantially J-shaped ribs and a backrest located between the first and second substantially J-shaped ribs, wherein each rib is formed to include a beam-receiver channel,
a rigidifying system including a first stiffener beam located in the beam-receiver channel formed in the first substantially J-shaped rib and coupled to the seat back and a second stiffener beam located in the beam-receiver channel formed in the second substantially J-shaped rib and coupled to the seat back, and
a headrest mounted for up-and-down movement on the seat back, wherein the headrest includes a first load-transfer flange that is arranged to engage and slide on a companion first load-receiver rail included in the seat back and coupled to the first substantially J-shaped rib during up-and-down movement of the headrest relative to the seat back and a second load-transfer flange that is arranged to engage and slide on a companion second load-receiver rail included in the seat back and coupled to the second substantially J-shaped rib during up-and-down movement of the headrest relative to the seat back.

22. A child restraint comprises
a juvenile seat including a seat bottom and a seat back arranged to extend upwardly from the seat bottom and formed to include first and second ribs and a backrest located between the first and second ribs, wherein each rib is formed to include a beam-receiver channel,
a rigidifying system including a first stiffener beam located in the beam-receiver channel formed in the first rib and coupled to the seat back and a second stiffener beam located in the beam-receiver channel formed in the second rib and coupled to the seat back, and
a headrest mounted for up-and-down movement on the seat back, wherein the headrest includes a first load-transfer flange that is arranged to engage and slide on a companion first load-receiver rail included in the seat back and coupled to the first rib during up-and-down movement of the headrest relative to the seat back and a second load-transfer flange that is arranged to engage and slide on a companion second load-receiver rail included in the seat back and coupled to the second rib during up-and-down movement of the headrest relative to the seat back,
wherein the headrest includes a head cradle located on a front side of the seat back and above the seat bottom and a cradle retainer located on an opposite rear side of the seat back and coupled to the head cradle to move therewith along a path adjacent to the backrest and between the first and second ribs and the cradle retainer includes the first and second load-transfer flanges.

23. The child restraint of claim 22, wherein the backrest is formed to include first and second belt-travel channels located between the first and second ribs, the cradle retainer is formed to include a first belt-receiving slot arranged to lie between the first and second load-transfer flanges and aligned to communicate with the first-belt travel channel during up-and-down movement of the cradle retainer along the backrest and a second belt-receiving slot arranged to lie between the first and second load-transfer flanges and aligned to communicate with the second belt-travel channel during up-and-down movement of the cradle retainer along the backrest, and further comprising a child-restraint harness coupled to the juvenile seat and configured to restrain a child seated on the seat bottom, the child-restraint harness including a first shoulder belt arranged to pass through the first belt-travel channel formed in the backrest and the first belt-receiving slot formed in the cradle retainer and a second shoulder belt arranged to pass through the second belt-travel channel formed in the backrest and the second belt-receiving slot formed in the cradle retainer.

24. The child restraint of claim 23, wherein the cradle retainer further includes a central bed arranged to interconnect the first and second load-transfer flanges and formed to include the first belt-receiving slot receiving the first shoulder belt and the second belt-receiving slot receiving the second shoulder belt, the first load-transfer flange includes inner, middle, and outer flange segments, the inner flange segment is coupled to the central bed, the outer flange segment is arranged to lie in spaced-apart relation to the inner flange segment and between the inner flange segment and the first stiffener beam, and the middle flange segment is arranged to interconnect the inner and outer flange segments.

25. The child restraint of claim 24, wherein the inner, middle, and outer flange segments of the first load-transfer flange cooperate to provide the first load-transfer flange with a Z-shaped cross-sectional shape.

26. The child restraint of claim 23, wherein the first load-receiver rail includes inner, middle, and outer rail segments, the inner rail segment is coupled to the first rib and arranged to engage the outer flange segment of the first load-transfer flange, the outer rail segment is arranged to lie in spaced-apart relation to the inner rail segment and engage the inner flange segment of the first load-transfer flange, and the middle rail segment is arranged to interconnect the inner and outer rail segments and engage the middle flange segment of the first load-transfer flange.

27. The child restraint of claim 26, wherein the inner, middle, and outer flange segments of the first load-receiver rail cooperate to provide the first load-receiver rail with a Z-shaped cross-sectional shape.

28. A child restraint comprises
a juvenile seat including a seat bottom and a seat back extending upwardly from the seat bottom,
a child-restraint harness coupled to the juvenile seat, and
a headrest coupled to the child-restraint harness and mounted for up-and-down movement on the seat back, wherein a first load-transfer flange included in the headrest is arranged to engage and slide on a companion first load-receiver rail included in the seat back during up-and-down movement of the headrest relative to the seat back, the headrest also includes a second load-transfer flange arranged to engage and slide on a companion second load-receiver rail included in the seat back, and the seat bottom and seat back cooperate to form a seat shell, and wherein
the juvenile seat further includes a shell-rigidifying system coupled to the seat shell, the shell-rigidifying system includes first and second stiffener beams coupled to the seat bottom and back to rigidify the seat shell, the first stiffener beam is arranged to extend along and lie near to the first load-receiver rail included in the seat back, and the second stiffener beam is arranged to extend along and lie near to the second load-receiver rail included in the seat back, and wherein the headrest includes a head cradle located on a front side of the seat back above the seat bottom to receive the head of a child seated in the juvenile seat, the headrest also includes a slidable cradle retainer located on an opposite back side of the seat back and coupled to the head cradle to move therewith during up-and-down movement of the headrest on the seat back, the slidable cradle retainer is formed to include the first and second load-transfer flanges and is coupled to the first and second shoulder belts, the slidable cradle retainer is configured to provide means for transferring loads applied by the first and second shoulder belts to the slidable cradle retainer in response to movement of the seated child relative to the juvenile seat to tension the first and second shoulder belts during exposure of a vehicle carrying the juvenile seat to an external impact to the first and second stiffener beams in the rigidifying system via two load-transfer paths established by mating engagement of the first and second load-transfer flanges on the slidable cradle retainer and the companion first and second load-receiver rails included in the seat back and arranged to extend along and lie near to the first and second stiffener beams.

29. The child restraint of claim 28, wherein the headrest is configured to provide means for engaging the child-restraint harness to receive a load applied to the child-restraint harness by a seated child seated and restrained on the seat bottom of the juvenile seat during movement of the seated child relative to the juvenile seat in response to a sudden stop of a moving vehicle carrying the juvenile seat and transferring the load from the headrest to the rigidifying system coupled to the seat shell via a first load-transfer path established by mating engagement of the first load-transfer flange included in the headrest and the companion first load-receiver rail included in the seat back and arranged to extend alongside the first stiffener beam and via a second load-transfer path established by mating engagement of the second load-transfer flange included in the headrest and the companion second load-receiver rail included in the seat back and arranged to extend alongside the second stiffener beam.

30. The child restraint of claim 28, wherein each of the load-transfer flanges and load-receiver rails has a Z-shaped cross-sectional shape.

* * * * *